E. H. HEUSCH.
PROCESS OF MANUFACTURING COAT-OF-MAIL FABRIC.
APPLICATION FILED DEC. 8, 1914.
1,197,627.
Patented Sept. 12, 1916.
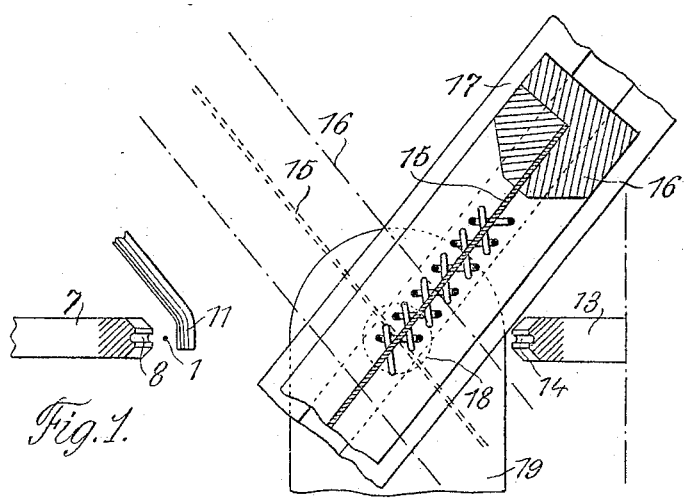
Fig. 1.
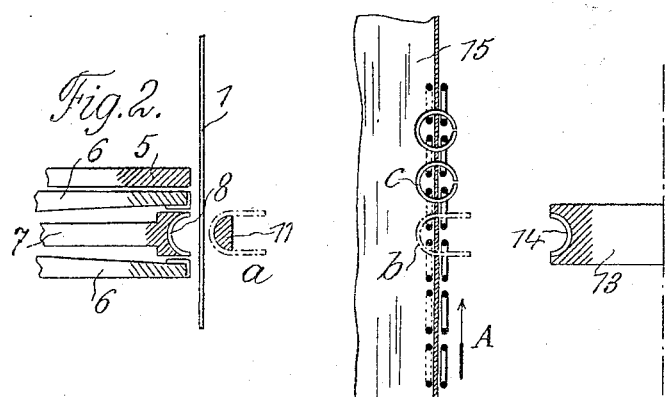
Fig. 2.
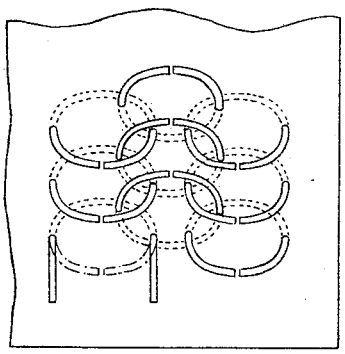
Fig. 3.
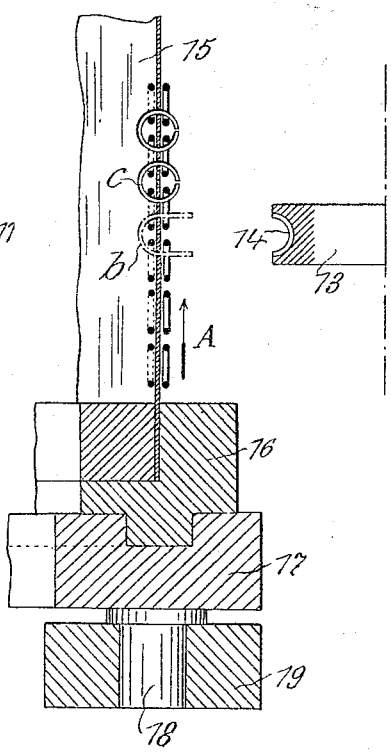
Witnesses:-
Charles B. Crompton
May G. Luttrell
E. H. Heusch,
Inventor.
By Gordon Marks
Attorney.

UNITED STATES PATENT OFFICE.

EDUARDO H. HEUSCH, OF BARCELONA, SPAIN.

PROCESS OF MANUFACTURING COAT-OF-MAIL FABRIC.

1,197,627.  Specification of Letters Patent.  Patented Sept. 12, 1916.

Application filed December 8, 1914. Serial No. 876,128.

*To all whom it may concern:*

Be it known that I, EDUARDO H. HEUSCH, a subject of Germany, residing at Barcelona, Spain, have invented certain new and useful Improvements in the Process of Manufacturing Coat-of-Mail Fabric, and I do hereby declare the following to be a full, clear, and exact description of the invention, such as will enable others skilled in the art to which it appertains to make and use the same.

This invention relates to the manufacture of coat-of-mail fabric, the object being to improve the process for forming such fabric.

The invention consists briefly in the use of a sheet made of a material adapted to be readily perforated and to support the rings in position during their formation, the process being to cut off short lengths of wire from a continuous strip, press the same into a U-shape, thence force the same partly through the supporting sheet and into the desired position with relation to the other rings, and finally closing the U-shaped link into ring form. The sheet is then shifted to insert the next link and so on, the rings being disposed in parallel rows and in such a manner that their inclination with respect to the supporting sheet varies from row to row, as hereinafter described, so that each link passes through two of the rings of the preceding row.

The junction of the two ends of each ring is welded or soldered; and it will be understood that this operation may be very readily, and is preferably, accomplished while the rings are in position on the supporting sheet. After all the links have been inserted, closed into rings and soldered, the temporary supporting sheet is destroyed leaving the completed coat-of-mail fabric. If desired the rings may be welded or soldered after removal of the supporting sheet but another advantage which arises from doing this before such removal is that by making the sheet of insulating material the welding may be effected by electrical means since the rings are maintained in their proper relative meshed positions without touching one another. For preparing the said U-shaped links, threading the same into the preceding ones, and closing them, tools may be employed such as are employed for the manufacture of cards for carding.

The machine hereinafter described is provided with means for holding the sheet between movable tools which are adapted to force the link into the sheet and close the same and with means for permitting a rotational and translational movement of the sheet.

Referring now to the accompanying drawings which illustrate one form of machine suitable for carrying out the process of manufacture, Figure 1 is a vertical section showing the two ring-forming tools with the supporting sheet and its carrying means located therebetween. Fig. 2 is a horizontal section of the same; Fig. 3 shows, on an enlarged scale, a piece of the fabric on the supporting sheet.

The continuous metallic wire 1 is advanced intermittently and cut by a cutter 5. The length of wire so cut is caught and bent by means of tongs or pliers 6 acting in conjunction with a die or matrix 7, which ends in a semi-circular groove 8 of the same diameter as the rings wanted, and an arm 11 adapted to move up and down in front of the die 7. These tools work in conjunction to give to the cut length of wire the U shape and to force it through the supporting sheet 15, in a manner similar to the tools employed in the manufacture of cards as aforesaid. Opposite to the die 7, is placed a movable counter-die 13, the end of which has a semicircular groove 14 also of the same diameter as the rings to be shaped. The said counter-die is employed to close the rough rings.

Between the dies 13 and 7 is arranged the supporting sheet 15, fitted on a frame 16, adapted to slide between the uprights of a frame 17, provided with trunnions 18, resting on bearings 19. The axis of the said trunnions is horizontal and perpendicular to the common axis of the die 7 and counter-die 13.

The bearings 19 may be fixed, in which case the supports of the tools 6, 7, 11, 13 are movable together in a direction parallel to the axis of the trunnions 18. Conversely, the supports of the tools may be fixed, and in that case, the bearings 19 would be displaceable in a similar direction.

The operation of the mechanism is as follows: The frame 17 being maintained in the sloping position shown in full lines in Fig. 1 of the drawings, the wire 1 is fed forward and cut by the cutter 5; the length of wire so cut being maintained between the die 7 and the arm 11. The tongs or pliers 6 then move forward and bend the said length of wire around the arm 11 as shown in dotted lines at $a$ in Fig. 2. The tools 6, 7, and 11 together with the U-shaped wire then move together toward the supporting sheet 15, until in close proximity. Then the tongs or pliers 6 stop and the arm 11 is withdrawn, and the die 7, continuing its forward movement forces the said U-shaped wire through the sheet 15, as shown in dotted lines at $b$ (Fig. 2). The counter-die 13, having moved forward in the opposite direction, causes the ends of the U-shaped wire to be bent in so that it takes the shape of a closed ring. After this, the tools move apart, leaving the ring fixed in the supporting sheet. The tools and the means which support the sheet 15 are then relatively displaced in the direction of the axis of the trunnions 18, for example by moving said supporting means in the direction of the arrow A (Fig. 2) whereby, when the operation is repeated a new link is placed on the sheet, at the same level as the preceding one, and at a convenient distance therefrom, such distance being called the horizontal pitch. By this means a whole horizontal line or row of rings is obtained. The frame 17 is then oscillated so as to take the contrary inclination as shown in dotted lines in Fig. 1, and the frame 16 is somewhat lifted. The supporting means of the sheet 15 are then moved in a direction opposed to the arrow A, a distance equal to one half of the aforesaid horizontal pitch. The above described operation of the tools is then repeated so as to form a new line or row of rings $c$, sloping in an inverse direction to, and all in mesh with, the preceding rings. At the end of the second line, the sheet 15 is again oscillated or swung back to its first-mentioned position and is displaced in the direction of the arrow A so as to form a third line or row of rings which pass through the rings of the second line or row and are placed parallel to and immediately above the ones of the first line or row. It is also possible to form the coat-of-mail fabric by first forcing into the supporting sheet all the rows or lines of rings sloping in the same direction, and afterward swinging the frame 17 which bears the supporting sheet and then applying the rows of rings which slope in the opposite direction.

The welding of the rings may be effected while they are on the machine or afterward and may be carried out by means of a soldering lamp or an electric arc. The use of the latter is especially easy if the sheet 15 is made of an insulating material, such as paper, cloth, asbestos, etc. If welded while in the machine each ring can be welded on the place where it has been formed as soon as the tools have been moved apart but preferably after it has been moved aside one or more steps from the axis of the tools.

When the welding has taken place, the supporting sheet is destroyed by any convenient means according to the material used, i. e., either by mechanical destruction or by combustion or dissolution, etc.

In the above description it has been assumed that the coat-of-mail fabric to be produced was of a certain definite length, but a continuous strip could be formed by using a continuous supporting sheet or strip guided partially or totally upon a swinging support and over rollers or the like. The edges of this strip might be perforated for feeding it forward.

Obviously this invention is quite independent of the means which the constructor might use for giving to the tools or to the supporting sheet or strip the various movements required. The tools might for instance be driven in the same manner as they are in the machines used in the manufacture of cards for carding. The vertical displacement of the supporting sheet after the formation of each row or line of rings and the horizontal displacement of the tools, or of the sheet after the formation of each single ring, might also be obtained in the same way as they are obtained in carding machines. As to the swinging movement of the support after the formation of each row or line of rings, this may be effected by hand or, if preferred, automatically through a convenient tappet or cam on the machine.

What I claim is:—

1. A process for forming a coat-of-mail fabric, consisting in forcing partly formed metallic rings into a sheet of readily perforated material whereby they are temporarily held in the desired relative interlocking positions, closing said partly formed rings, and destroying the temporary supporting sheet.

2. A process for forming a coat-of-mail fabric, consisting in forcing partly formed metallic rings in rows into a sheet of readily perforated material, the partly formed rings of each row being inclined to those of the adjacent rows and interlocking therewith, closing said partly formed rings, and destroying the supporting sheet.

3. A process for forming a coat-of-mail fabric, consisting in forcing partly formed metallic rings in rows into a sheet of readily perforated material, the partly formed rings of each row being inclined to those of the adjacent rows and interlocking therewith, completing the formation of the rings after their insertion into said sheet, joining the ends of the rings, and destroying the supporting sheet.

4. A process for forming a coat-of-mail fabric, consisting in intermittently feeding a continuous strip of metallic wire, cutting off sections from said strip, forming said sections into a U-shape, forcing them in rows into a sheet of readily perforated material and into interlocking relation with one another, completing the formation of the U-shaped wires into rings after their insertion into said sheet, and destroying the supporting sheet.

5. A process for forming a coat-of-mail fabric, consisting in cutting off a section from a continuous strip of metallic wire, bending said strip into a U-shape, forcing said U-shaped strip into a sheet of readily perforated material at an angle thereto, bending the ends of said strip to form it into a ring shape, moving the sheet laterally, step by step, and repeating the above operations at each step so as to form a row of rings, raising the sheet slightly and oscillating the same so that, when forcing into it a new row of U-shaped strips, the latter will be oppositely inclined to the sheet, forcing into the sheet said new row in interlocking relation with the rings of the first-mentioned row, closing said U-shaped strips, oscillating the sheet back into its first position but again slightly raising the same, and so on, repeating the process until the desired number of interlocking rows have been produced, and finally destroying the supporting sheet.

In testimony whereof I have signed my name to this specification in the presence of two subscribing witnesses.

EDUARDO H. HEUSCH.

Witnesses:
  CONSTANTINO LOPEZ CID,
  N. JUBERT.

Copies of this patent may be obtained for five cents each, by addressing the "Commissioner of Patents, Washington, D. C."